United States Patent [19]

Splitstoser et al.

[11] Patent Number: 4,986,411
[45] Date of Patent: Jan. 22, 1991

[54] CONTINUOUS MOTION VERTICAL CONVEYOR

[75] Inventors: Bradley S. Splitstoser, Fond du Lac; Richard Klaeser, Kiel, both of Wis.

[73] Assignee: H. G. Weber & Co., Inc., Kiel, Wis.

[21] Appl. No.: 409,579

[22] Filed: Sep. 19, 1989

[51] Int. Cl.$^5$ ............................................. B65G 47/04
[52] U.S. Cl. ................................ 198/475.1; 198/798; 198/799
[58] Field of Search ..................... 198/475.1, 798, 799

[56] References Cited

U.S. PATENT DOCUMENTS

| | | | |
|---|---|---|---|
| 864,438 | 8/1907 | Szczys | 198/799 X |
| 1,270,000 | 6/1918 | Boos et al. | 198/475.1 |
| 2,190,783 | 2/1940 | Hardy | 198/799 |
| 3,515,257 | 6/1970 | Smith et al. | 198/799 X |
| 4,168,009 | 9/1979 | Ide | 198/475.1 X |
| 4,193,725 | 3/1980 | Schiepe et al. | 198/799 X |
| 4,214,848 | 7/1980 | Verwey et al. | 198/475.1 X |
| 4,465,177 | 8/1984 | Dorner | 198/799 X |

FOREIGN PATENT DOCUMENTS

| | | | |
|---|---|---|---|
| 2346342 | 3/1975 | Fed. Rep. of Germany | 198/799 |
| 0074808 | 4/1988 | Japan | 198/799 |
| 0606768 | 5/1978 | U.S.S.R. | 198/799 |
| 1392007 | 4/1988 | U.S.S.R. | 198/799 |

Primary Examiner—H. Grant Skaggs
Assistant Examiner—James R. Bidwell
Attorney, Agent, or Firm—Hill, Van Santen, Steadman & Simpson

[57] ABSTRACT

A continuous vertical conveyor having a horizontal infeed and a vertically displaced horizontal outfeed and a horizontal platform continuously moving between the infeed and outfeed while supported on staggered transport chains so as to remain horizontal even while making a transition between horizontal and vertical directions of travel. The horizontal platform has an upwardly extending arm and a downwardly extending arm to which the chains are pivotally attached so as to provide stability to the platform. The platform is configured with relieved areas between fingers so that it will interleave with infeed and outfeed conveyors and horizontal supports at the infeed and outfeed stations as it passes through the stations.

12 Claims, 5 Drawing Sheets

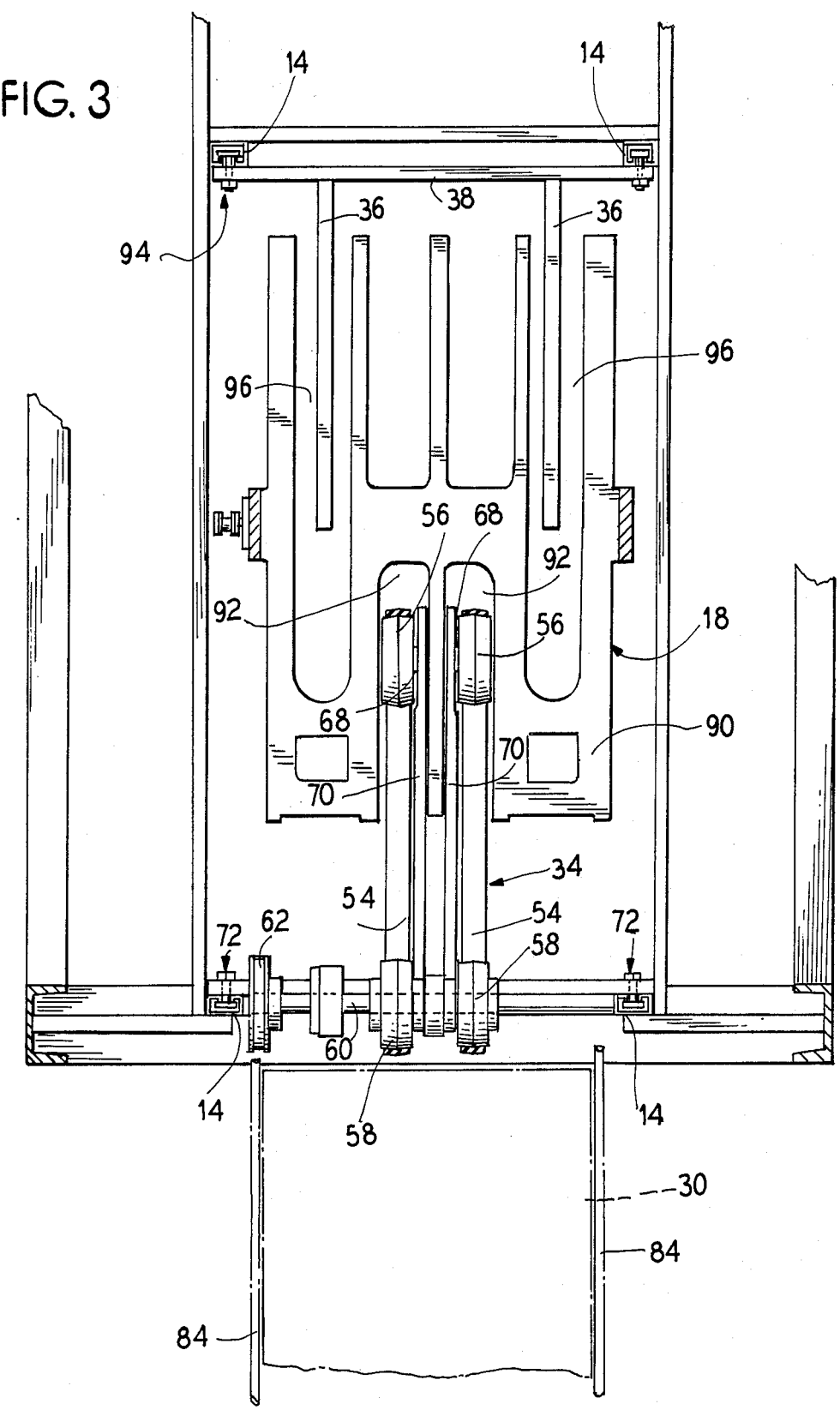

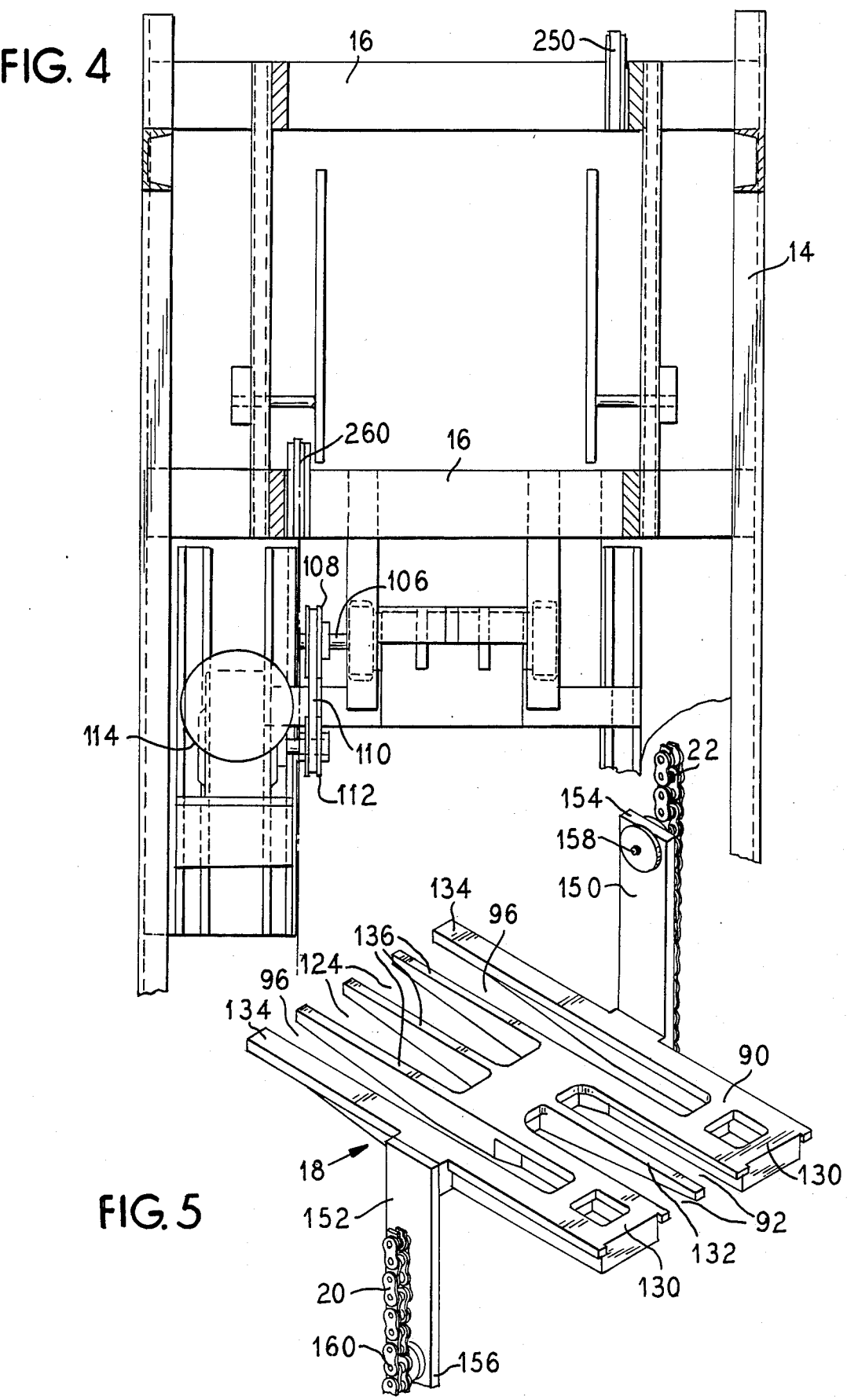

CONTINUOUS MOTION VERTICAL CONVEYOR

BACKGROUND OF THE INVENTION

This invention relates to conveyors and more particularly to a vertical conveyor having an infeed at one vertical end and an outfeed at the other vertical end of the conveyor.

Vertical conveyors having an infeed at one vertical end and an outfeed at the other vertical end generally are operated incrementally to permit a loading of the material onto the conveyor at the infeed and an unloading of the material at the outfeed. Operating the conveyors incremental considerably slows the speed of the conveyor over a continuous motion speed and the starting and stopping causes increased wear and vibration on the motors and other moving parts of the conveyor system.

It would therefore be an improvement in the art to provide a vertical conveyor which has a faster speed of operation than presently available vertical conveyors.

It would be a further improvement in the art to provide a vertical conveyor which reduces the wear and vibration caused by intermittent operation of the conveyor system.

SUMMARY OF THE INVENTION

The present invention provides a vertical conveyor system which operates continuously and therefore operates at a higher speed and with less wear and vibration than an intermittently operating vertical conveyor.

The conveyor has an infeed at one vertical end and an outfeed at the other vertical end. A pair of continuous chains or belts carry a plurality of pivotally mounted flights which have horizontal fingers designed to interleave with an infeed station and an outfeed station to pick-up and carry the materials to be moved by the conveyor and to deposit them at the outfeed station, all the while continuously moving. The chains are arranged such that the fingers are always held horizontal with an upper surface continuously facing upwardly. This is true even when the flights make a transition from upward through horizontal to downward and downward through horizontal to upward movement as the flights are carried around the conveyor system by the chains.

BRIEF DESCRIPTION OF THE DRAWINGS

FIG. 3 is a top sectional view of the infeed station and flight of the conveyor taken generally along the line III—III of FIG. 1.

FIG. 4 is a sectional view of a top, horizontal transition portion of the conveyor taken generally along the line IV—IV of FIG. 1.

FIG. 5 is a perspective view of a flight of the conveyor.

DETAILED DESCRIPTION OF THE PREFERRED EMBODIMENTS

Figure 1:
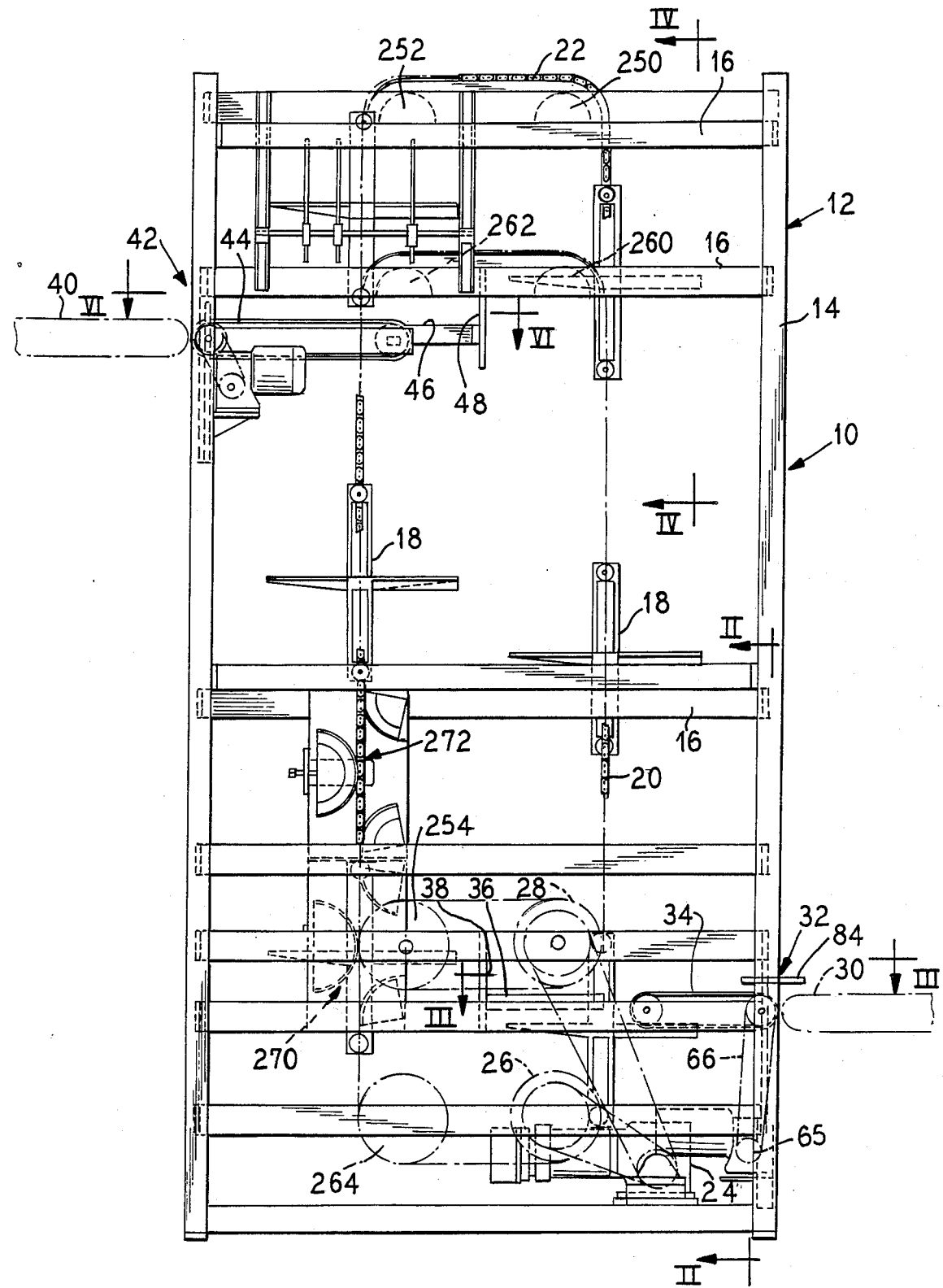
FIG. 1 is a side elevational view of a vertical conveyor embodying the principles of the present invention.

In FIG. 1 there is illustrated a continuous motion vertical conveyor generally at 10 which comprises a support framework 12 consisting of a number of vertical support members 14 and a number of horizontal support members 16. A plurality of flights 18 are pivotally supported between a pair of endless chains 20, 22. A single motor 24 operates separate drive sprockets 26, 28 to drive the chains 20, 22 in a continuous circuitous manner.

An infeed conveyor 30 is positioned adjacent to an infeed station 32 which forms a part of the conveyor 10. The infeed station 32 has a short, horizontal, powered conveyor 34 and a fixed horizontal support 36 with an end stop 38. An outfeed conveyor 40 is positioned at a higher elevation and is positioned adjacent to an outfeed station 42 which forms part of the conveyor 10. The outfeed station has a short horizontal, powered, conveyor 44 and a fixed support surface 46 with an end stop 48.

Figure 2:
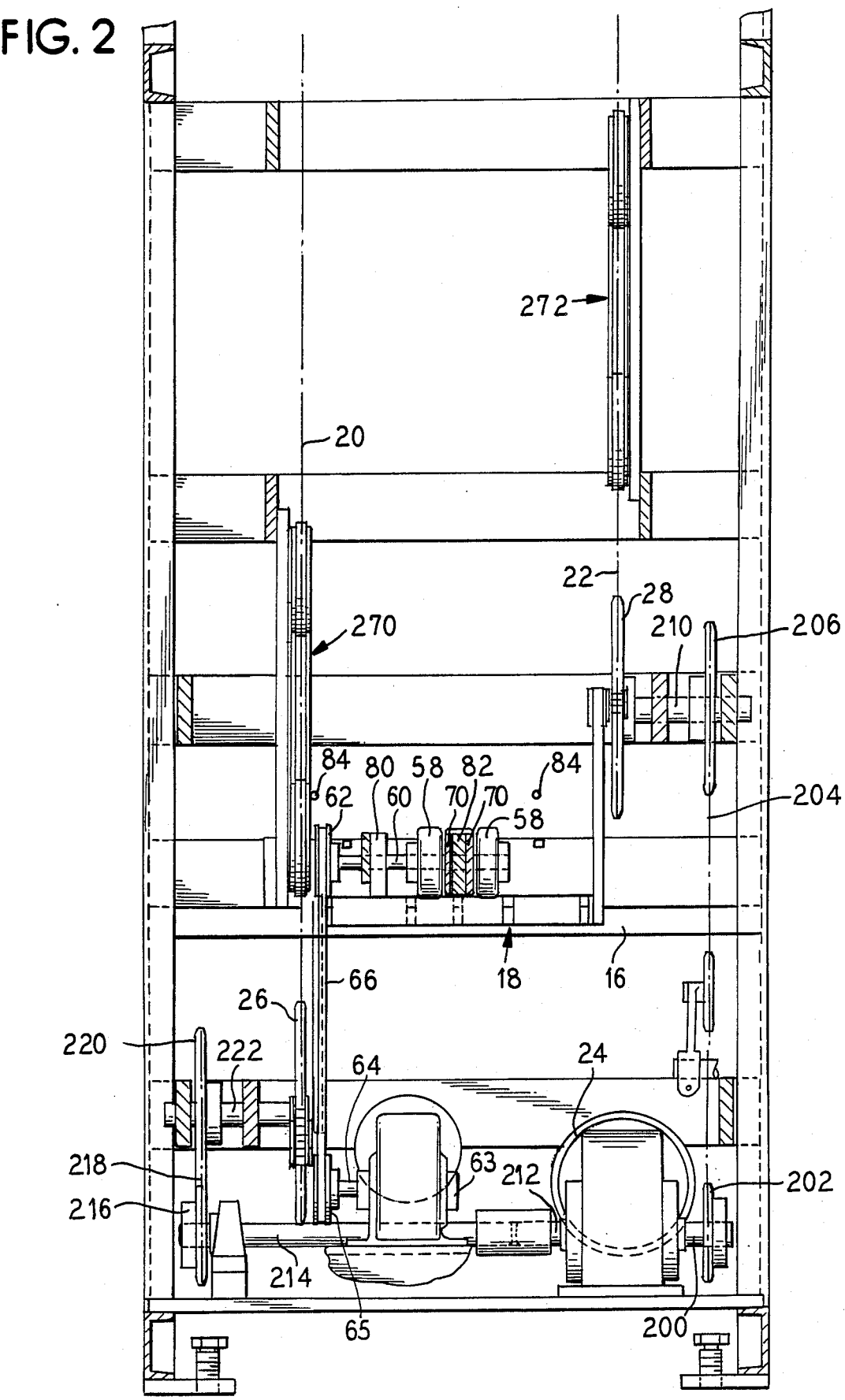
FIG. 2 is a side sectional view of an infeed station and flight of the conveyor taken generally along the line II—II of FIG. 1.

The infeed station 32 is shown in greater detail in FIGS. 2 and 3 where it is seen that the short powered conveyor 34 may comprise a plurality of individual and spaced belts 54 which are each supported on a pair of rollers 56, 58. The rollers 58 are connected by appropriate means, such as a spline or keyed connection, to a shaft 60 which in turn is connected to a drive pulley or sheave 62 driven by a motor 63 having an output shaft 64 carrying a pulley or sheave 65. A drive belt 66 is carried on the sheaves 62, 65. The rollers 56 are free wheeling and are supported by a stub shaft 68 on an arm 70 which is cantilevered out from a horizontal frame member 16. The entire horizontal frame member can be adjusted vertically through adjustable securing means 72 such as bolts carried in a channel, the channel forming a portion of the vertical support frame 14. The shaft 60 is supported by bearing mounts 80, 82 which are secured to the same, vertically adjustable horizontal frame member 16.

A pair of guide rods 84 are positioned to extend horizontally at the infeed station 32 to guide materials from the infeed conveyor 30 onto the short powered conveyor 34, the horizontal support 36 and against the end stop 38 and to assure that the materials will align with the flight 18 which interleaves with the infeed station 32.

The flight 18 has a generally rectangular horizontal surface 90 forming a horizontal platform which has relieved or recessed areas 92 providing clearance for the short conveyor belts 54 and support arms 70. In this manner, the flight 18 interleaves with the conveyor belts 54 as the flight 18 makes its continuous movement past the infeed station 32.

Opposite the powered conveyor 34 are the support arms 36 which are attached to the end stop 38. The end stop 38 is secured to vertical frame members 14 by adjustable fastening means 94. The support arms 36 extend toward the infeed powered conveyor 34, but are laterally spaced relative thereto. The flight 18 has additional relief or recessed areas 96 to prevent interference between the flight 18 and the support arms 36 so that the flight may pass unhindered through the infeed station 32.

Figure 6:
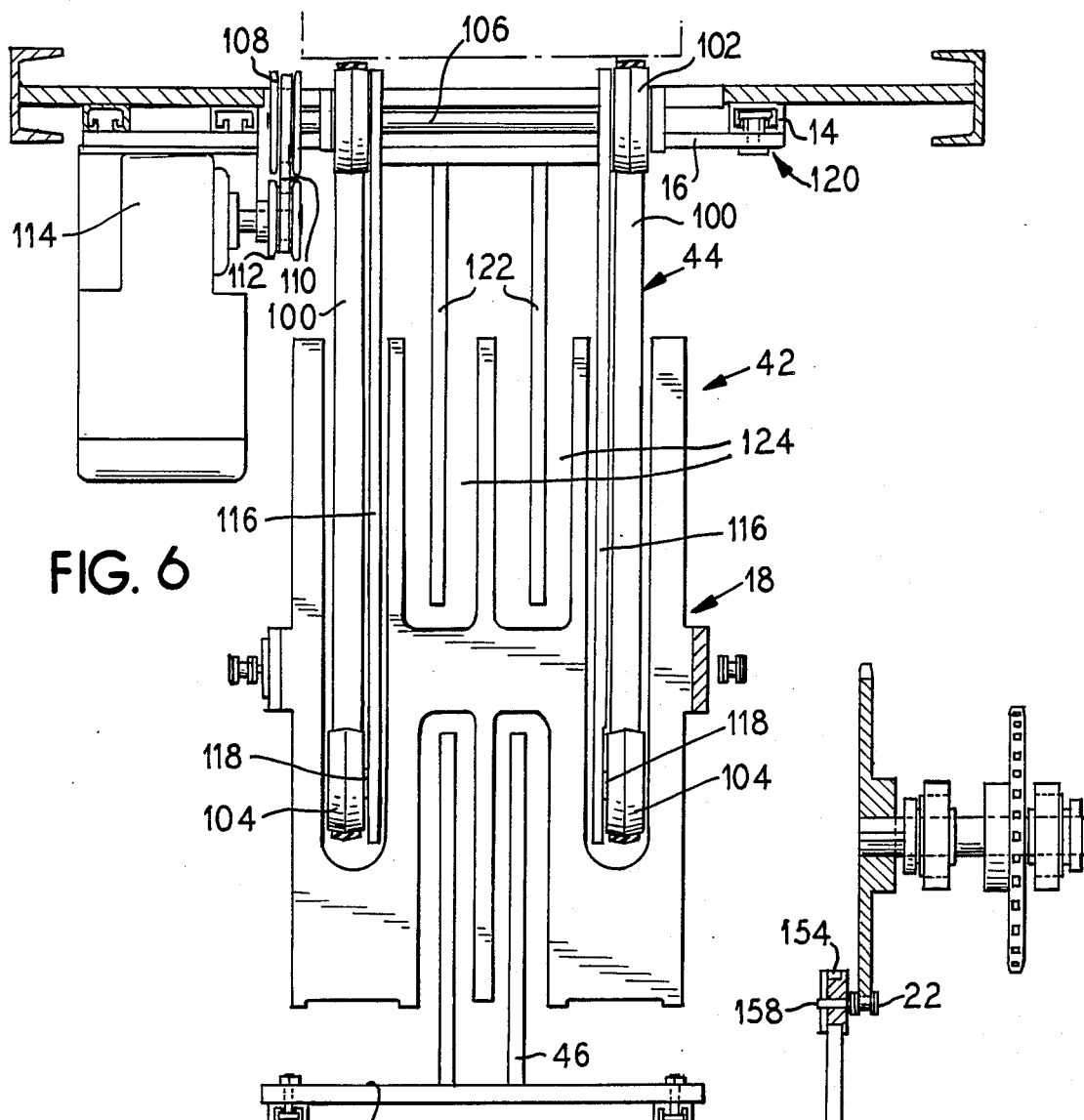
FIG. 6 is a top sectional view of an outfeed station and flight of the conveyor taken generally along the line VI—VI of FIG. 1.
Figure 7:
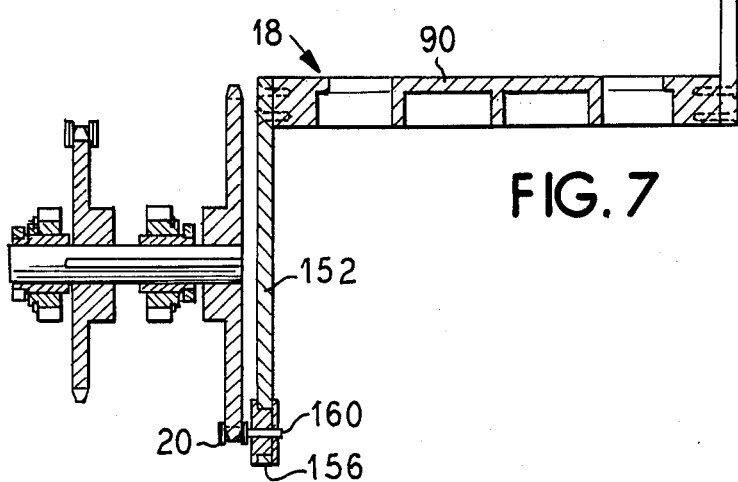
FIG. 7 is a side sectional view of a single flight of the conveyor system as it is positioned in a bottom, horizontal transition portion of the vertical conveyor system.

The outfeed station 42 is shown in detail in FIG. 6 wherein it is seen that the output powered conveyor 44 comprises a pair of belts 100 which are each supported on a powered roller 102 and a free wheeling roller 104. The powered rollers 102 are connected to a shaft 106 which in turn is connected to a sheave 108 driven by belt 110 carried on a drive pulley 112 rotated by a motor 114. The free wheeling rollers 104 are supported on arms 116 which have stud shafts 118 protruding therefrom. The arms and the rollers 102 are mounted on a horizontal frame member 16 which in turn is secured to a vertical frame member 14 by adjustable fastening means 120 similar to those described above. Two additional horizontal support arms 122 are provided between the two output station conveYor belts 100 to provide additional support to loads being discharged. The flight 18 thus has additional relief or recessed areas 124 for passage of the support arms 122.

The flight 18 is shown in perspective in FIG. 5 and it is seen that the upper rectangular surface 90 has the relief areas 92, 96 and 124 thus resulting in two wide outboard fingers 130 and a central narrow finger 132 at one side of the flight and two outboard fingers 134 and three spaced central fingers 136 at an opposite side of the flight. Such fingers and relief areas permit passage of the flight unhindered through the infeed and outfeed stations while permitting materials to be picked up by the horizontal surface 90 of the flight as it passes the infeed station and for delivering and depositing such materials to the outfeed conveyor at the outfeed station.

That is, materials such as boxes or cartons or other types of materials preferably having large flat bottom surfaces are introduced on the infeed conveyor 30 to the powered conveyor 34 and are stopped by the infeed stop 38 so as to rest on the support arms 36 as well as the infeed conveyor belts 54. As a flight approaches the infeed station from below, the flight surface 90 passes through the plane of the supporting arms 36 and conveyor belt 54 and will thus pick up the material held on those supports. As the flight passes downwardly through the outfeed station 42, the material is left on the support arms 122, 46 and outfeed belt 100 without requiring stoppage of the transit of the flight 18.

The outfeed station powered conveyor belts 100 are substantially longer than the counterpart conveyor belts 54 at the infeed station to assure a pickup of the materials which are deposited on the outfeed station. Unlike the infeed station, the outfeed station must move materials from a horizontally at rest position whereas, at the infeed, the material is already being moved horizontally by the infeed conveyor 30 and possibly such materials are being pushed by other items carried on conveyor belt 30.

In order that the flight surface 90 retain a horizontal orientation throughout its continuous circuitous path, the flight is provided with two lateral arms 150, 152 one of which (150) extends upwardly from the support surface 90 and the other of which (152) extends downwardly from the support surface 90. Near a distal end 154, 156 of each arm is secured a pivot pin 158, 160 which is pivotally secured to one of the chains 20, 22 that extend in a continuous path around the conveyor system. The flight is pivotally supported on the chains, but at two different horizontal elevations. Thus, the flight surface 90 is held against pivoting due to the offset connection between the chains 20, 22 and the flight arms 150, 152.

The two chains 20, 22 follow vertically staggered paths in the conveyor system. The chains are guided along two vertical and two horizontal paths with the horizontal paths being vertically offset.

The chains are driven or transported by the motor 24 through the sprockets 26 and 28 as seen in FIGS. 1 and 2, the motor being coupled to a first output shaft 200 having an output gear 202 carried thereon which, through a drive chain 204 drives a driven gear 206 which connects through a shaft 210 to the drive sprocket 28.

A second output shaft 212 of the motor 24 connects through a cross shaft 214 to a drive sprocket or sheave 216 connected by means of a drive chain or belt 218 to a driven sprocket or sheave 220 connected by means of a shaft 222 to the drive sprocket 26. Thus, the single motor 24 drives both chains 20, 22 at an equal rate of speed. The chain 22 is diverted from a vertical to a horizontal path by guide 250 supported at a top end of the conveyor frame 12 and, transition from horizontal back to vertical is achieved by means of a guide 252 supported in the same vertical position, but horizontally displaced, from the guide 250. The transition from vertical downward movement to horizontal of the chain 22 is provided by a free wheeling sprocket wheel 254 having the same vertical position as drive sprocket 28 thus defining a lower horizontal path for chain 22. Chain 20 follows a similar, but vertically downwardly displaced path and has two guide members 260, 262 which define an upper horizontal path and has a free wheeling sprocket 264 which with drive sprocket 26 defines a lower horizontal path of chain 22.

The upper guides 260, 262 and 250, 252 as well as the lower sprocket wheels 26, 264 and 28, 254 are vertically staggered by an amount equal to the stagger between the pivot pins 158, 160 carried by the flight 18. Thus, the flight 18 will be carried from a vertical path to a horizontal path while maintaining the horizontal orientation of the top surface 90 of the flight.

To assure that the chains 20, 22 are maintained in a taut condition, each of the chains passes through a chain tightening device 270, 272 which is a series of opposed and laterally adjustable, but vertically spaced arcuate guides (best seen in FIG. 1) which can be moved laterally into the path of the chains to increase the path length of the chains and therefore remove any slack from the chains.

It has been found to be advantageous to construct the flights 18 out of a light weight yet sturdy plastic material and many of the components such as the guides 250, 252 and 260, 262 as well as the chain tightening devices 270, 272 can also be made of a light weight yet sturdy plastic material to reduce the manufacturing cost as well as the weight of the conveyor system. Further, although two separate motors 24, 63 are shown for running the conveyor chanis and infeed powered conveyor 34, respectively, a single motor could be utilized with appropriate gear ratios to provide the necessary speeds for the conveyor chains 20, 22 and the infeed belt 34 speeds.

Other modifications can be made, such as replacing the conveyor belts with conveyor rollers, replacing the chains with belts or a path of powered rollers, using direct drive motors rather than the belt drive disclosed, reorienting the infeed 30 and 34 and outfeed conveyor 44 and 40 by 90° in a horizontal plane to direct the materials exiting the conveyor system along a path perpendicular to that which they originally followed, and exchanging the vertical positions of the infeed and outfeed stations such that the infeed is at a higher elevation, all without departing from the scope of the present invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim as our invention:

1. A continuous motion vertical conveyor comprising:
   a first flexible endless member disposed to travel in a first generally rectangular path of travel;
   a second flexible endless member disposed to travel in a second generally rectangular path of travel;
      said second path of travel lying in a plane parallel to said first path of travel and vertically offset from said first path of travel;
   a plurality of horizontal platforms adapted to support articles to be conveyed;
      said platforms each having a first upwardly extending arm pivotally attached at a free end thereof o said first flexible endless member and a downwardly extending arm pivotally attached at a free end thereof to said second flexible endless member, said arms being formed on opposite sides of said platform;
   drive means for driving said endless members in synchronization;
   an infeed station for horizontally receiving materials to be conveyed;
   an outfeed station for horizontally discharging materials from the conveyor at an elevation different from that of said infeed station;
   means operatively associated with said infeed and outfeed stations for permitting said platforms to pass through said infeed and outfeed stations to pick up and discharge, respectively, materials without requiring said platform to change speed as it passes through said stations.

2. A continuous motion conveyor according to claim 1, wherein said infeed station comprises a horizontal conveyor means and at least one horizontal fixed support member with a stop means operatively associated therewith such that said materials are positioned at said infeed station by said horizontal conveyor means and are supported by said support member and horizontal movement of said materials is stopped by said stop means.

3. A continuous motion conveyor according to claim 1, wherein said outfeed station comprises a horizontal conveyor means and at least one horizontal fixed support member such that said materials are received and supported at said outfeed station by said support member and are discharged from the station by said horizontal conveyor member.

4. A continuous motion vertical conveyor according to claim 1, wherein said arms are formed near a center of said platform.

5. A continuous motion vertical conveyor comprising:
   an infeed station having a horizontal conveyor means an, a horizontal support means and a horizontal stop means;
   an outfeed station vertically displaced from said infeed station having a horizontal conveyor means and a horizontal support means;
   at least one flight member having a horizontal surface configured so as to interleave with said conveyor means and said support means of said infeed and outfeed stations;
   a continuously moving transport means engaging said flight so as to continuously move said flight between said infeed and outfeed stations;
      said transport means comprising a first flexible endless member disposed to travel in a first generally rectangular path of travel, a second flexible endless member disposed to travel in a second generally rectangular path of travel, said second path of travel lying in a plane parallel to said first path of travel and vertically offset from said first path of travel;
      said flight members each being pivotally attached to said first flexible endless member at an elevation above said horizontal surface and pivotally attached to said second flexible endless member at an elevation below said horizontal surface.

6. A continuous motion vertical conveyor according to claim 5, wherein aid continuously moving transport means comprises continuous chains attached to said flight, said chains being continuously moved through said vertical conveyor.

7. A continuous motion vertical conveyor according to claim 5, wherein said flight has a horizontal surface with relieved areas therein to allow passage of said conveyor means and said support means of said infeed and outfeed stations.

8. A continuous motion vertical conveyor according to claim 5, wherein said outfeed station is horizontally as well as vertically displaced from said infeed station.

9. A continuous motion vertical conveyor according to claim 5, including horizontal guide means at said infeed station to guide materials along said horizontal infeed conveyor means and onto said infeed horizontal support means and against said stop means.

10. A continuous motion vertical conveyor according to claim 5, wherein said outfeed station is at an elevation above that of said infeed station.

11. A continuous motion vertical conveyor according to claim 5, wherein said flight members each have a first upwardly extending arm pivotally attached at a free end thereof to said first flexible endless member and a downwardly extending arm pivotally attached at a free end thereof to said second flexible endless member, said arms being secured to opposite sides of said flight member.

12. A continuous motion vertical conveyor according to claim 11, wherein said arms are formed near a center of said flight member.

* * * * *